July 11, 1944.  S. KAHN  2,353,472
COMBINED PRESSURE AND VACUUM GAUGE
Filed Jan. 17, 1942
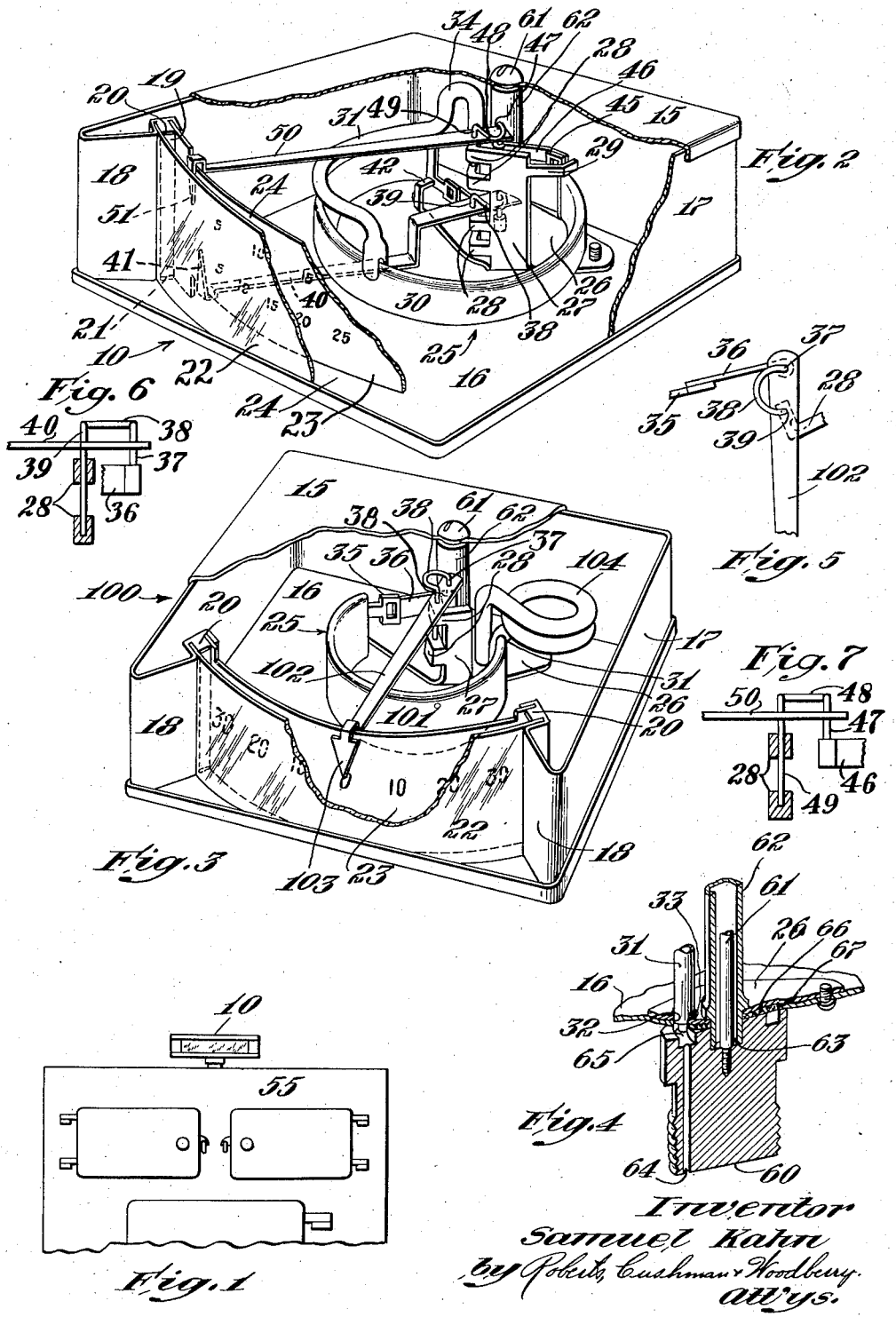
Inventor
Samuel Kahn
by Roberts, Cushman & Woodbury
Attys.

Patented July 11, 1944

2,353,472

UNITED STATES PATENT OFFICE 2,353,472

COMBINED PRESSURE AND VACUUM GAUGE

Samuel Kahn, Bridgeport, Conn., assignor to Manning, Maxwell & Moore, Incorporated, New York, N. Y., a corporation of New Jersey Application January 17, 1942, Serial No. 427,145

17 Claims. (Cl. 73—109)

This invention pertains to gauges and more particularly to a gauge of the Bourdon tube type designed to indicate both pressure and vacuum. One object of the invention is to provide a gauge of this kind wherein the drop or rise in pressure through the zero point may be indicated continuously and without interruption. A further object is to provide a combined pressure and vacuum gauge of simply and sturdy construction; which may be manufactured economically; and which is reliable in action. Further objects and advantages of the invention will be pointed out in the following more detained description and by reference to the accompanying drawing wherein:

Fig. 1 illustrates a gauge made in accordance with this invention mounted upon a boiler;

Fig. 2 is a perspective view, to much larger scale, with portions broken away, showing one embodiment of this invention;

Fig. 3 is a view, similar to Fig. 2, of another embodiment of this invention;

Fig. 4 is a detail, in section, illustrating a desirable means of mounting the gauge of the embodiment shown in Fig. 2;

Fig. 5 is a plan view illustrating, an an enlarged scale, the mounting of the pointer of the gauge of the embodiment shown in Fig. 3; and Figs. 6 and 7 are views generally similar to Fig. 5 showing the mounting of the two pointers respectively of the embodiment illustrated in Fig. 2.

In one embodiment of this invention as herein illustrated, the gauge is provided with two pointers, one designed to indicate pressure and the other to indicate vacuum, the two pointers being arranged to move in the same direction in indicating increase in pressure and vacuum, respectively. In another embodiment the gauge has but a single pointer which moves in opposite directions to indicate increase in pressure and vacuum, respectively.

The gauge 10 shown in Fig. 2 has a rectangular casing comprising flanged top and bottom plates 15 and 16 and a continuous strip 17 bent to form side and rear walls and terminating at the front in angularly bent walls 18. Each wall 18 terminates in a vertical channel 19 and has lugs 20 and 21 which project into said channel at top and bottom thereof. An arcuate panel 22 of transparent material has its opposite ends respectively disposed in said channels 19 in contact with the front edges of said lugs 20 and 21. A similarly formed dial 23 has its opposite ends respectively disposed in said channels 19 in contact with the rear edges of the lugs 20 and 21. The upper and lower edges of the dial 23 are cut away intermediate their edges to provide slots 24 between the dial and the top and bottom plates.

The pressure responsive unit 25 is mounted within the casing upon a base plate 26 removably attached to the bottom plate 16. Projecting upwardly from the plate 26 is an upright 27, which conceivably may be or may not be integral therewith as shown in Fig. 2. Spaced pairs of fingers 28 project outwardly from one edge of the upright 27 and a single bent finger 29 projects outwardly from the other edge of the upright near the top thereof.

The Bourdon tube 30 is supported intermediate its ends by a conduit or siphon 31 through which pressure is transmitted to the tube 30 in the usual manner. The conduit or siphon 31 is seated at one end in an opening 32 in the base plate 26 and bottom plate 16 (Fig. 4) and secured therein by soldering or welding 33. A trap 34 is formed by bending the siphon intermediate its ends.

Fixed to one end of the tube 30 is a tip 35 which is connected to one end of a link 36. The other end of the link 36 is looped around a crank pin 37 formed at one end of a bent rod 38, the other end of which forms a pivot member 39 journaled in bearings formed in the lower pair of fingers 28 so as to be freely rotatable therein. The parts 37 and 39 also pass through holes formed in a pointer 40 which is fixed to one of said parts by soldering, welding or the like so that the pointer 40 is movable by and in unison with the rod 38.

The pointer 40 is suitably bent to pass under the tube 30 and through the slot 24 between the dial 23 and bottom plate 16 and terminates in a tip 41, which extends upwardly in front of a lower row of graduations on the dial. A suitably formed stop 42 carried by the base plate 26 is adapted to engage the tip 35 and thus limit inward movement of that end of the tube so that the corresponding pointer 40 can not move beyond the zero position in response to decrease in internal pressure. Thus, this end of the tube can respond only to the expansive movement caused by an increase in pressure, and the pointer 40, being actuated only by such movement, will be hereinafter referred to as the pressure pointer and the end of the tube carrying the tip 35 will be hereinafter referred to as the pressure end.

The other or vacuum end of the tube 30 is similarly provided with a tip 45 and link 46, and the latter pivotally receives a crank pin 47 formed on one end of a rod 48, the other end of which forms a pivot member 49 which is journaled in bearings formed in the upper pair of fingers 28 so as to be freely rotatable therein. The parts 47 and 49 pass through holes formed in the vacuum pointer 50 which is fixed in any suitable manner to one of said parts so that the pointer 50 is movable by and in unison with the rod 48. The pointer 50 passes through the slot 24 between the dial 23 and the top plate 15 and terminates in a tip 51 which extends downwardly in front of an upper row of graduations on the dial. The stop finger 29 acts, as shown in Fig. 2, to engage the tip 45 and limit the expansive movement of the vacuum end of the tube beyond the zero position.

The gauge 10 is attached to the boiler 55 or other machine by means of an adapter 60 to which it is removably secured by a screw 61 which extends through a spacing sleeve 62. The sleeve 62 is seated in a well 63 in the top of the adapter and the screw engages in the base of such well. A passage 64 in the adapter 60 leads to an annular groove 65 which surrounds the depression 63 and into which the conduit 31 opens. A gasket 66 of rubber, fiber or other suitable material seals the space between the plate 26 and the adapter, being seated in a cavity 67 in the bottom plate 16.

When mounted upon the boiler 55, the gauge indicates the status of the pressure in the boiler, being connected thereto by the passage 64, groove 65 and conduit 31. If the pressure be positive, the pointer 40 is actuated by the pressure end of the tube 30, and if the pressure be negative, the pointer 50 is actuated by the vacuum end of the tube. Both pointers are so connected to the ends of the tube by which they are actuated that they travel in the same direction whether indicating increase or decrease. Moreover, only one pointer is in motion at any time, and any change in the status of pressure conditions either positive or negative is immediately indicated by the proper pointer. Thus, the operator is at all times advised of the pressure conditions within the boiler.

The gauge 100 shown in Fig. 3 is similar in general construction to the gauge 10 hereinbefore shown and described, and the elements common to both gauges will be indicated by the same reference characters.

The Bourdon tube 101 of the pressure responsive unit 25 is mounted at its stationary end upon the siphon or conduit 31. The single pointer 102 is carried by the crank pin 37 and the pivot element 39 of the rod 38 which is journaled in bearings in the fingers 28. The crank pin 37 is connected to the free end of the Bourdon tube by tip 35 and link 36. The tip 103 of the pointer normally assumes the zero position shown intermediate the ends of the rows of graduations on the dial 23. The pointer 102 is moved to the right of the zero position by the expansion of the tube and to the left thereof by the contraction of the tube so that the tip 103 indicates pressure or vacuum, respectively. The conduit 31 is provided with loops 104 which constitute a trap whereby escape of liquid from and entry of steam into the tube are prevented. The gauge 100 is mounted upon an adapter 60 in the same manner as is the gauge 10, and pressure is transmitted to the tube 101 through the conduit 31, as described above.

While two embodiments of the invention have been shown and described, it will be understood that it is not limited thereto and that other embodiments may be made without departing from the spirit and scope of the invention as set forth in the following claims.

I claim:

1. A gauge by which both pressure and vacuum are indicated comprising a substantially rectangular casing, an arcuate graduated dial including a zero graduation corresponding to a selected pressure condition, said dial being carried by one side wall of said casing, a pressure responsive unit mounted within said casing and including a Bourdon tube, a siphon by which said tube is supported and through which pressure is transmitted to said tube, the siphon engaging the tube at a point intermediate the ends of the latter, leaving both ends of the tube free to deflect in response to pressure variations, a pair of pointers pivotally supported at their inner ends and terminating at their outer ends in tips movable along the dial, connections for transmitting motion from the free ends of the tube to the respective pointers, and stop means operative to prevent movement of the respective ends of the tube in one direction away from a point corresponding to coincidence of the respective pointers with the zero dial graduation, the parts being so constructed and arranged that one of said pointers is actuated by the expansion of the tube to indicate pressure and the other of said pointers is actuated by the contraction of said tube to indicate vacuum.

2. A gauge by which both pressure and vacuum are indicated comprising a substantially rectangular casing, an arcuate graduated dial including a zero graduation corresponding to a selected pressure condition, said dial being carried by one wall of said casing, a pressure-responsive unit mounted within said casing and including a Bourdon tube, a siphon by which said tube is supported and through which pressure is transmitted to said tube, the siphon engaging the tube substantially midway between the ends of the latter, leaving said ends free to respond to pressure variations, a pair of pointers pivotally supported at their inner ends and terminating at their outer ends in tips which are movable along said dial, connections for transmitting motion from the tube ends to the respective pointers, a stop operative to prevent motion of one end of the tube in one direction away from a point which corresponds to a zero indication of its respective pointer, a second stop operative to prevent motion of the other end of the tube in one direction away from a point which corresponds to a zero position of its respective pointer, the parts being so constructed and arranged that one of said pointers is actuated by the expansion of the tube to indicate pressure and the other of said pointers is actuated by the contraction of said tube to indicate vacuum, the tips of both said pointers moving over the dial in the same direction to indicate increases in pressure or vacuum, respectively.

3. A gauge by which both pressure and vacuum are indicated comprising a substantially rectangular casing, an arcuate dial carried by one side wall of said casing, a pressure responsive unit mounted within said casing and including a Bourdon tube, a siphon secured to said tube midway between its ends, which siphon supports said tube and transmits pressure thereto, a pair of pointers pivotally supported at their inner ends and terminating at their outer ends in tips movable along said dial, means connecting the inner end of one pointer to one end of the tube, means connecting the inner end of the other pointer to the other end of the tube, and stop means preventing movement of one end of the tube when the latter tends to expand and movement of the other end of the tube when the latter tends to contract, respectively, from a neutral position whereby one pointer is actuated to move its tip over the dial upon the contraction of the tube and the other pointer is actuated to move its tip over the dial upon the expansion of the tube.

4. A gauge by which both pressure and vacuum are indicated comprising a casing which houses a graduated dial including a zero graduation corresponding to a selected pressure condition, a pair of movable pointers cooperable with the dial, pressure motor means comprising a pair of drive elements which move in response to pressure variations, connections for transmitting motion from the respective drive elements to the pointers, and stop means operative to prevent movement of each of the respective drive elements in one direction away from positions corresponding, respectively, to zero positions of the corresponding pointers, the parts being so constructed and arranged that one of the pointers moves away from the zero position in response to increase in pressure above zero, and the other moves away from the zero position in the same direction in response to increasing vacuum.

5. A gauge by which both pressure and vacuum are indicated comprising a casing, a dial stationarily supported thereby, a pressure responsive unit mounted within said casing and including a Bourdon tube, a siphon secured to said tube midway between its ends and through which the pressure to be indicated is transmitted to said tube, both ends of said tube being free, a pair of pointers movable over said dial, one pointer being connected to one end of the tube and actuated by the expansion thereof and the other pointer being connected to the other end of the tube and actuated by the contraction thereof, and means by which movement of either end of the tube is prevented when the other end of the tube is in motion.

6. A gauge by which both pressure and vacuum are indicated comprising a casing, a dial stationarily supported thereby, a pressure responsive unit mounted within said casing and including a Bourdon tube, a siphon secured to said tube midway between its ends and through which the pressure to be indicated is transmitted to said tube, both ends of said tube being free, a pair of pointers movable over said dial, one pointer being connected to one end of the tube and actuated by the expansion thereof and the other pointer being connected to the other end of the tube and actuated by the contraction thereof, and means by which the movement of the first named end of the tube in response to the contraction of the tube and the movement of the second named end of the tube in response to the expansion of the tube are limited.

7. A gauge by which both pressure and vacuum are indicated comprising a casing, a dial stationarily supported thereby, a pressure responsive unit mounted within said casing and including a Bourdon tube, a siphon secured to said tube midway between its ends and through which the pressure to be indicated is transmitted to the tube, both ends of the tube being free, a base plate, a pair of pointers pivotally supported by said plate, each pointer terminating in a tip movable over said dial, stop means operative to prevent each pointer from moving in one direction beyond its zero position, and means so connecting the free ends of the tube to the respective pointers that one pointer only indicates positive pressure and the other pointer only indicates vacuum.

8. A gauge by which both pressure and vacuum are indicated comprising a casing, a dial stationarily supported thereby, a pressure responsive unit mounted within said casing and including a Bourdon tube, a siphon secured to said tube midway between its ends and through which the pressure to be indicated is transmitted to the tube, both ends of the tube being free, a base plate, a pair of pointers pivotally supported by said plate, each pointer terminating in a tip movable over said dial, and connections between the free ends of the tube and said pointers whereby one pointer indicates positive pressure and the other pointer indicates vacuum, and means carried by said base plate which means prevent movement of either pointer when the other pointer is in the indicating position.

9. A gauge by which both pressure and vacuum are indicated comprising a casing, a dial stationarily supported thereby, a pressure responsive unit mounted within said casing and including a Bourdon tube, a siphon secured to said tube midway its ends and through which the pressure to be indicated is transmitted to the tube, both ends of the tube being free, a base plate, an upright projecting upwardly from said plate, a pair of pointers pivotally supported by said upright at the inner ends thereof, each pointer terminating at its outer end in a tip movable over said dial, connections between the free ends of the tube and said pointers whereby one pointer indicates pressure and the other pointer indicates vacuum, and limit stops carried by said plate and so positioned as to be engaged by said connections and prevent movement of the pressure pointer when the vacuum pointer is actuated and vice versa.

10. A gauge comprising a casing, a dial stationarily supported thereby, said dial being cylindrically curved about a vertical axis, a pressure responsive unit mounted within said casing and including a Bourdon tube, a siphon secured at one end to one end of said tube through which pressure is transmitted to said tube, the other end of said tube being freely movable, a base plate to which the other end of the siphon is attached, a pointer pivotally supported at its inner end by said base plate to turn about the vertical axis of curvature of the dial, the outer end of the pointer being movable relative to said dial, and a connection between the inner end of said pointer and the Bourdon tube whereby said pointer is actuated to indicate the pressure set up in the tube, and an adapter device having a screw-threaded portion for screw-threaded engagement with an aperture in the wall of a fluid-pressure container, said adapter having a passage leading to an annular groove in its outer end, and means operative to secure the casing to the outer end of the adapter in a fluid-tight sealing relation with respect to the annular groove, and with the conduit in the siphon in communication with said annular groove.

11. A gauge by which both pressure and vacuum are indicated comprising a rectangular casing, a dial mounted in one side wall thereof, said dial being cylindrically curved about a vertical axis, a pressure responsive unit mounted within the casing and including a Bourdon tube, a siphon secured to one end of said tube and through which pressure is transmitted to said tube, a stationary upright mounted in said casing, a pointer pivotally at its inner end upon said upright to turn about the axis of curvature of the dial, the outer end of said pointer terminating in a tip movable over said dial, a connection between the free end of said tube and the inner end of said pointer whereby the pointer is actuated by said tube, and an adapter device having a portion designed for securing it to the wall of a fluid-pressure container, said adapter having an arcuate groove in its outer surface and having a passage leading from its inner end to said groove, means for securing the casing to said grooved outer end of the adapter, and packing means interposed between the casing and said grooved surface of the adapter to provide a fluid-tight seal with respect to the annular groove, the conduit in the siphon communicating with said groove.

12. In a combined pressure and vacuum gauge, a Bourdon tube, means supporting the tube at a point intermediate its ends so as to leave both ends free to move in response to variations in internal pressure, means operative to prevent movement of one end of the tube away from a predetermined point in response to increased pressure and to prevent movement of the other end of the tube away from a predetermined point in response to decreased pressure, movable index means, and connections between the index means and each end of the tube.

13. In a combined pressure and vacuum gauge, a graduated dial including a zero graduation corresponding to a selected pressure condition, a Bourdon tube, means supporting the tube so that both its ends are free to move in response to variations in internal pressure, a pressure indicator, a vacuum indicator, and means connecting said indicators to the respective tube ends, said connecting means being constructed and arranged to move both indicators in one and the same direction away from the zero point in response to increasing pressure and vacuum, respectively, and stop means operative to prevent movement of both indicators in the opposite direction beyond the zero point.

14. In a combined pressure and vacuum gauge, a graduated dial including a zero graduation corresponding to a selected pressure condition, a Bourdon tube, means supporting the tube so that both its ends are free to move in response to variations in internal pressure, a pair of indicators, one for indicating pressure and the other vacuum, respectively, the tube ends tending to move in opposite directions in response to increasing internal pressure, means operative to limit movement of each tube end in one direction away from positions corresponding, respectively, to coincidence of the respective indicators with the zero graduation of the dial, and connections for transmitting motion from the tube ends to the respective indicators, the connections being so constructed and arranged as to cause the indicators to move in the same direction away from the zero point in response to increasing pressure and vacuum, respectively.

15. In an instrument of the class described wherein a pressure motor device causes a pointer to move along a graduated scale in response to variations in fluid pressure, a case of generally rectangular contour, the case comprising substantially rectangular, vertically spaced top and bottom walls and a strip of thin material forming the rear and right and left side walls respectively, said strip of material being bent rearwardly and inwardly at the respective front corners of the case and having sockets at its vertical inner rear edges, a transparent cylindrically curved panel having its opposite ends seated in said sockets respectively, the panel being coaxial with the pointer, and a dial also cylindrically curved coaxially with the panel and spaced inwardly from the latter.

16. In an instrument of the class described wherein a pressure motor device causes a pointer to move along a graduated scale in response to variations in fluid pressure, a case of generally rectangular contour, said case comprising vertically spaced top and bottom walls and a strip of thin material forming the rear and right and left side walls respectively of the case, said strip being bent at the respective front corners of the case so that the end portions of the strip extend inwardly and rearwardly, the free, rear ends of these rearwardly directed portions of the strips being shaped to form sockets, a cylindrically curved transparent panel having its opposite ends seated in said sockets, a dial also cylindrically curved but of a radius slightly less than that of the panel having its opposite ends seated in said sockets respectively, and means spacing the dial and panel, the pointer turning about the vertical axis of curvature of the dial and panel and having an index portion located in the space between the dial and panel, the dial having a recess in its horizontal edge to accommodate the pointer.

17. In a combined pressure and vacuum gauge, a graduated dial including a zero graduation corresponding to a selected pressure condition, a plurality of index means cooperable with said dial, a Bourdon tube, means supporting the tube so that both of its ends are free, a stop arranged to prevent one end of the tube from moving, in response to increase in internal pressure, beyond that point which corresponds to coincidence of one index means with the zero graduation of the dial, a stop arranged to prevent the other end of the tube from moving, in response to decrease in internal pressure beyond that point which corresponds to coincidence with another index means with the zero graduation of the dial, and means whereby motion of either tube tip away from its respective stop correspondingly moves index means away from the zero graduation of the dial.

SAMUEL KAHN.